United States Patent
Lopez-Moreira et al.

(10) Patent No.: US 10,911,534 B2
(45) Date of Patent: Feb. 2, 2021

(54) METHOD AND SYSTEM FOR SELECTING A COMMUNICATION CONNECTION CANDIDATE FOR TRANSMISSION OF A MEDIA STREAM

(71) Applicant: Unify Patente GmbH & Co. KG, Munich (DE)

(72) Inventors: Alexandre Lopez-Moreira, Curitiba (BR); João Luis Barros, Curitiba (BR)

(73) Assignee: Unify Patente GmbH & Co. KG, Munich (DE)

( * ) Notice: Subject to any disclaimer, the term of this patent is extended or adjusted under 35 U.S.C. 154(b) by 0 days.

(21) Appl. No.: 16/441,643

(22) Filed: Jun. 14, 2019

(65) Prior Publication Data
US 2020/0007619 A1    Jan. 2, 2020

(30) Foreign Application Priority Data
Jun. 27, 2018    (EP) .................................... 18180235

(51) Int. Cl.
*H04L 29/08* (2006.01)
*H04L 12/18* (2006.01)
*H04L 12/851* (2013.01)

(52) U.S. Cl.
CPC .......... *H04L 67/1059* (2013.01); *H04L 12/18* (2013.01); *H04L 47/24* (2013.01); *H04L 67/1091* (2013.01)

(58) Field of Classification Search
CPC ...... H04L 67/1059; H04L 12/18; H04L 47/24
See application file for complete search history.

(56) References Cited

U.S. PATENT DOCUMENTS

| | | | | |
|---|---|---|---|---|
| 9,332,561 B1 * | 5/2016 | Khawam | ............. | H04L 65/1069 |
| 9,883,521 B2 * | 1/2018 | Tietsch | ............... | H04L 61/2575 |

(Continued)

OTHER PUBLICATIONS

Interactive Connectivity Establishment (ICE): A Protocol for Network Address Translator (NAT) Traversal for Offer/Answer Protocol; Internet Engineering Task Force (IETF); J. Rosenberg, Apr. 2010.

(Continued)

*Primary Examiner* — Adnan M Mirza
(74) *Attorney, Agent, or Firm* — Buchanan Ingersoll & Rooney PC

(57) ABSTRACT

A system and method for selecting a communication connection candidate for transmission of a media stream via a media connection over a communications network can include use of the ICE protocol for selecting a transmission communication connection candidate for transmitting the media stream from a local peer to a remote peer. During transmission of the media stream from the local peer to the remote peer via the selected transmission communication connection candidate, the communication connection candidates can be tested with respect to Quality of Service (QoS), in both communication directions. The QoS of at least one tested communication connection candidate can be compared to the QoS of the selected communication connection candidate transmitting the media stream. If a tested communication connection candidate provides a better QoS, then the transmission of the media stream can be switched to that communication connection candidate.

19 Claims, 4 Drawing Sheets

(56) References Cited

U.S. PATENT DOCUMENTS

2008/0062997 A1  3/2008  Nix
2011/0235543 A1  9/2011  Seetharaman et al.
2014/0089504 A1  3/2014  Scholz et al.
2014/0136718 A1  5/2014  Memzes et al.
2016/0094586 A1  3/2016  Gunnalan et al.
2017/0142165 A1  5/2017  Moore et al.

OTHER PUBLICATIONS

European Search Report for EP18180235 dated Nov. 7, 2018.

* cited by examiner

METHOD AND SYSTEM FOR SELECTING A COMMUNICATION CONNECTION CANDIDATE FOR TRANSMISSION OF A MEDIA STREAM

CROSS-REFERENCE TO RELATED APPLICATIONS

The present application claims priority to European Patent Application No. EP18180235.6, filed on Jun. 27, 2018. The entirety of this patent application is incorporated by reference herein.

FIELD

The present invention relates to a method for selecting a communication connection candidate for transmission of a media stream as well as with a corresponding system and at least one communication apparatus that can be adapted to utilize such a method.

BACKGROUND

In Internet Protocol (IP) telephony, such as Voice over Internet Protocol (VoIP), a media stream is transmitted via a communication connection between a local peer and a remote peer using a data network, as for example, the Internet. Establishing and terminating a communication connection is carried out according to a protocol (connection control or signaling) different from the protocols used for the actual communication during a call.

For example, if peer-to-peer networking is desired, the Interactive Connectivity Establishment (ICE) protocol, which enables two terminals communicating with each other directly without a central server there between, can be used as the signaling protocol for establishing and terminating the communication connection. Here, in general, there are several communication connection candidates potentially available between the local peer and the remote peer, each of which comprising a pair of addresses that are connected for transmitting or transporting the media stream, the local address and the remote address. Each communication connection candidate represents a potentially available connection possibility for reaching the remote peer from the local peer. As already mentioned above, the ICE (RFC5245) protocol is designed so as to determine whether a local peer and a remote peer to be connected to each other, in fact, are connectable via a pair of addresses. If it is determined that at least one communication connection candidate is available for connection, then one candidate is chosen, and the media stream is transmitted or transported using the chosen candidate. All the other communication connections available that are not used for media stream transmission nevertheless will remain established. These candidates remain connected, and ICE verification will be performed for the case where the chosen candidate pair is not available anymore, for any reason, to then perform the media stream transmission over that candidate. Namely, if for some reason one peer will not be able to reach the other peer by the chosen communication connection, the ICE protocol will also provide for switching the transmission or transport to another communication connection candidate which is determined to be working, i.e., a communication connection candidate which passes the connectivity check outlined above.

SUMMARY

We have determined that, since the ICE protocol enables switching to another communication connection candidate normally in case of connectivity problems, there remains a problem in case of the Quality of Service (QoS), which may degrade on the communication connection candidate selected for transmission of the media stream during its transmission.

For example, considering the possible connections of a mobile device for reaching a remote peer, as (a) a mobile network (4G), (b) a WiFi network trying to access the remote peer directly, or (c) a WiFi network trying to access the remote peer using TURN relay address, and the selected communication connection candidate has been network (b), then, the situation may occur that a problem other than a connectivity problem arises, for example, a problem related to the usable bandwidth in the network due to the user of the mobile phone being partially outside the range of the WiFi access point, or due to the WiFi network being occupied by too many users so that its bandwidth will not support the media traffic anymore.

In this case, the ICE protocol will not provide any indication on such problems, since connectivity still is available although the user may have poor audio quality due to network instabilities or low bandwidth leading to delays, jitter, packet loss, or other network artifacts degrading the quality of the transmitted media stream. Such degradation is not detected by the ICE protocol at all.

Therefore, embodiments of the present invention can be based on the object to overcome the above described problem. In particular, embodiments of the present invention can be based on the object to provide a method and system for selecting a communication connection candidate for transmission of a media stream on the basis of IP telephony as well as a corresponding system according to which the QoS is maintained during the transmission of a media stream. Embodiments of the present invention configured to address such issues can include a method for selecting a communication connection candidate for transmission of a media stream, a system for selecting a communication connection candidate for transmission of a media stream, and embodiments of a communication apparatus that may be configured to utilize the method or be incorporated into the system or designed to function as a system.

For example, a method for selecting a communication connection candidate for transmission of a media stream via a media connection over a communications network, the method comprising the steps of using the ICE protocol for selecting, based on a connectivity check, from a predetermined number of communication connection candidates, a transmission communication connection candidate for transmitting the media stream from a local peer to a remote peer; during transmission of the media stream from the local peer to the remote peer via the selected transmission communication connection candidate; testing the remaining communication connection candidates with respect to Quality of Service (QoS) in both communication directions, and comparing the QoS of each tested communication connection candidate to the QoS of the selected communication connection candidate transmitting the media stream; and if the comparison of the QoS of the selected communication connection candidate transmitting the media stream results in one of the remaining communication connection candidates providing a better QoS, then switching the transmission of the media stream to the communication connection candidate providing the better QoS.

By use of an embodiment of the inventive method, the QoS can be monitored and ensured during the entire duration of transmission of the media stream, as during a call, by testing the potentially available communication connection candidates as to transmission quality such that in case the communication connection candidate which has been selected for transmission is, for any reasons as already outlined above, no longer the connection providing the best QoS amongst all available communication connection candidates, then, it is switched to another communication connection candidate, which has been determined to be superior compared to the selected communication connection candidate. For example, if a WiFi network has been selected for transmission first, and the latter does not perform well or degrades during a call, then it may be switched to, for example, a mobile network which has been tested to be working with a better transmission quality. This procedure is carried out during the entire duration of a call so that the user always has the best QoS experience, no matter, where he or she is located or no matter how much traffic there may be in a currently used network. This is detected immediately and a loss of the QoS is remedied simply by switching to another network. Conveniently, switching can be carried out according to the ICE protocol.

According to a preferred embodiment, the step of testing the QoS is carried out using the ICE protocol. According to another preferred embodiment, the testing of the QoS is carried out periodically during the transmission of the media stream. The periodicity, however, preferably depends on the implementation of the method considering the processing time costs. Preferably, the step of testing the remaining communication connection candidates is carried out sequentially, one by one. In some embodiments, it can be advantageous, if only one quality verification of each communication connection candidate is carried out at a time in order to avoid interferences amongst the candidates due to lack of processing power or network bandwidth. It can also be advantageous in some embodiments to adapt the method so that, for switching the transmission of the media stream to the communication connection candidate providing the better QoS, a procedure defined in the ICE protocol is used.

Embodiments of the method can include additional steps. For example, an embodiment of the method can comprise a step of informing the local peer and the remote peer about the testing procedure. For instance, the start of the testing procedure may be initiated by the peer defined in the ICE protocol as the ICE-controlling peer, wherein the ICE-controlling peer will start the testing procedure for a first communication direction from the ICE-controlling peer to the remote peer, in particular, to the ICE-controlled peer.

For performing the step of testing, the method can include the step of adding a new attribute QUALITY-PROC into the ICE protocol, in particular, into a STUNBindRequest message and a STUNBindResponse message of the ICE protocol. By adding another procedure after the ICE protocol is performed, a media quality verification can also be enabled during the transmission of the media stream. The basic procedure for ICE protocol is based on STUN messages, the BindRequest and the BindResponse messages. These messages are filled with attributes to inform the STUN agent or peer that they are related to the ICE procedure. If the new attribute is added to the STUNBindRequest message, preferably, the new attribute comprises a parameter specifying a test duration value when being sent from the ICE-controlling peer, and a quality score value when being sent from the ICE-controlled peer.

According to still another preferred embodiment of the method, the ICE-controlling peer can select a first communication connection candidate to be tested from the remaining communication connection candidates whereby the ICE-controlling peer sends the STUNBindRequest message comprising the new attribute QUALITY-PROC to the ICE-controlled peer for starting the testing. Subsequent to the step of sending the STUNBindRequest message comprising the new attribute QUALITY-PROC, the ICE-controlling peer may start sending an audio test signal to the ICE-controlled peer via the first communication connection candidate to be tested. Further, the ICE-controlled peer, upon receiving the STUNBindRequest message comprising the new attribute QUALITY-PROC, may start an audio detection procedure. After starting the audio detection procedure, the ICE-controlled peer can preferably send a STUNBindResponse message with the new QUALITY-PROC attribute for informing the ICE-controlling peer that has started the testing procedure about a successful start. In some embodiments, it can be advantageous, if the step of switching the transmission of the media stream to the communication connection candidate providing the better QoS is carried out by the ICE-controlling peer.

A system for selecting a communication connection candidate for transmission of a media stream via a media connection over a communications network is also provided. The system can comprise a plurality of peer-to-peer communication connection candidates respectively adapted to connect a local peer and a remote peer via a communication network. Embodiments of the system can be adapted for carrying out an embodiment of the method discussed herein. Embodiments of the system can provide advantages as discussed herein with respect to the method for selecting a communication connection candidate. It should be appreciated that the peer-to-peer communication connection candidates can include or be structured as a communication device or communication apparatus. In some embodiments, the candidate can be a network connection option that includes at least one access point, which can be an electronic device having at least one processor connection to at least one non-transitory computer readable medium. Each local peer and remote peer can also be an electronic device, such as a communication terminal or a communication device. Each peer can be a device that includes at least one processor connected to a non-transitory computer readable medium (e.g. flash memory, other type of memory, etc.). For instance, each peer device can be a smart phone, a cellular phone, a tablet, a laptop computer, a personal computer, or other type of communication device.

Other details, objects, and advantages of the invention will become apparent as the following description of certain present preferred embodiments thereof and certain present preferred methods of practicing the same proceeds.

BRIEF DESCRIPTION OF THE DRAWINGS

The invention and embodiments thereof will be described below in further detail in connection with the drawings. It should be understood that like reference numbers used in the drawings may identify like components.

FIG. 4 includes a key for references *1 and *2 noted in the flow diagram.

Figure 1:
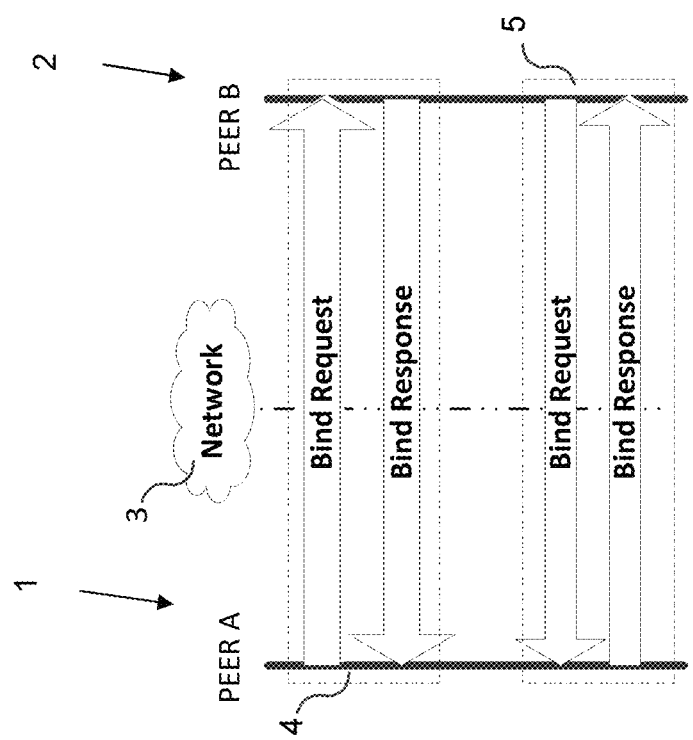
FIG. 1 schematically illustrates the normal procedure according to the ICE protocol.

In the drawings, the following reference numerals are utilized for the listed elements shown in the drawings:
1 is a local peer (PEER A)
2 is a remote peer (PEER B)
3 is a communications network
4 is a first communication direction
5 is a second communication direction
6 is a communication connection candidate
7 is a communication connection candidate
8 is a communication connection candidate

DETAILED DESCRIPTION OF EXEMPLARY EMBODIMENTS

FIG. 1 schematically illustrates the normal procedure according to the ICE protocol for a connectivity check. In general, each ICE candidate which represents a transport address, namely, a combination of IP address and port for a particular transport protocol describes a method which the originating peer (here: the local peer 1) is able to communicate. Each peer sends candidate checks in priority order, and keeps sending until it runs out of suggestions. Once the ICE controlling peer suggest a compatible candidate, media begins to flow.

As can be seen here, PEER A, representing a local peer 1, starts the procedure in a first communication direction 4 by sending its STUNBindRequest to PEER B, representing a remote peer 2, which responds with STUNBindResponse. The messages are exchanged via a communications network 3, as the Internet. Subsequently, PEER B or remote peer 2 starts the same procedure in order to check the other or second communication direction 5. After the flow is complete, there is a final result or decision concerning the state of the communication connection candidate, namely, whether there is connectivity between the local peer 1 and the remote peer 2, or not. Thus, this procedure of exchanging the messages above will assure that PEER A reaches PEER B with each connection candidate or, in other words, that the local peer 1 reaches the local peer 2 with each connection candidate.

It is noted that the attributes provided for informing the STUN agent or peer that the messages are related to an ICE procedure are defined in ICE documentation, following the STUN specification to add attributes.

Figure 2:
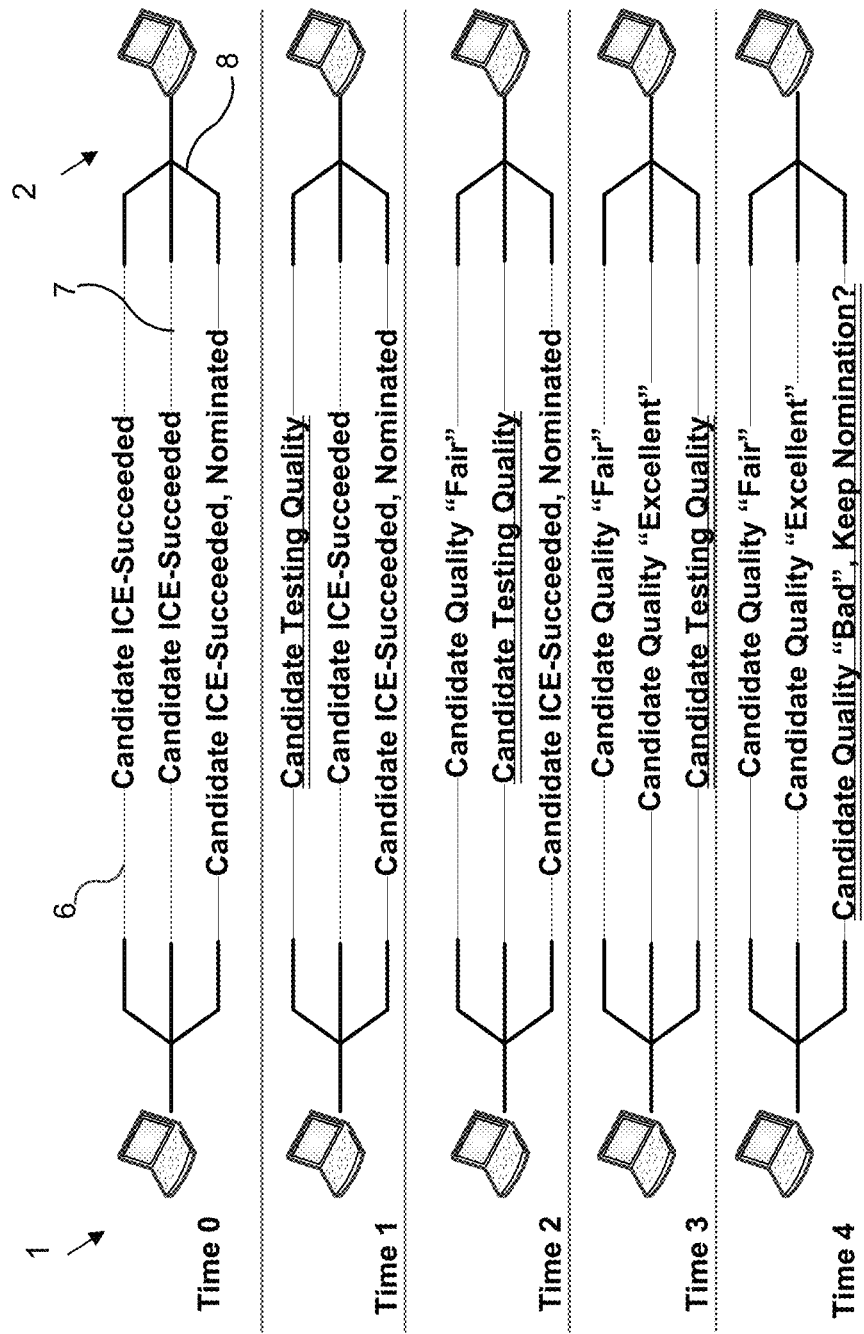
FIG. 2 schematically illustrates a quality verification flow according to an embodiment of the invention.

FIG. 2 schematically illustrates a quality verification flow according to an embodiment of the invention that involves a first local peer and a second remote peer. Each peer can be a device that includes at least one processor connected to a non-transitory computer readable medium (e.g. flash memory, other type of memory, etc.). For instance, each peer device can be a smart phone, a cellular phone, a tablet, a laptop computer, a personal computer, or other type of communication terminal or communication device. Each communication connection candidate can be a network connection option that includes at least one access point, which can be an electronic device having at least one processor connected to at least one non-transitory computer readable medium. Each communication connection candidate can facilitate a communication connection utilizing a different network (e.g. a first candidate can offer a connection via a wide area wireless network, a second candidate can offer a connection via a cellular network, and a third candidate can offer a connection via a wireless local area network, etc.). In other embodiments, each candidate can be a different candidate that can facilitate a communication with the same network.

As already explained above, according to the method for selecting a communication connection candidate for transmission or transport of a media stream via a media connection over a communications network 3, the quality of each communication connection candidate is checked or verified in order to be able to switch to the best one when the nominated or selected communication connection candidate does not offer a good quality anymore, or in case a communication connection candidate is found that offers far better quality than the nominated or selected one. The quality verification should be done periodically but its periodicity should depend on the implementation since it costs processing time. Also, it is recommended to perform only one quality verification of each connection candidate at a time in order to avoid interferences among the communication connection candidates due to lack of processing power or network bandwidth.

In FIG. 2, an example is illustrated in which three communication connection candidates have been established and are tested as to their transmission quality at different points of time. Namely, at "Time 0" of the procedure, there are three available communication connections (candidate ICE-succeeded 6, candidate ICE-succeeded 7, Candidate ICE-succeeded, nominated 8), one of which having been nominated or selected for transporting the media stream from the local peer 1 to the remote peer 2. At "Time 1", the uppermost or first communication connection candidate 6 is tested as to its quality, and at "Time 2", it is determined that its quality is "fair". At the same time, testing of the next (middle) communication connection candidate 7 is started. At "Time 3", the result of testing of the next (middle) communication connection candidate 7 is "excellent", thus, even better than the first tested communication connection candidate 6, the transmission quality of which has been found to be "fair". At "Time 4", then, the transmission quality of the selected communication connection candidate 8, via which transport or transmission of the media stream takes place, is found to be "bad", so that a decision has to be made on keeping the selected communication connection candidate 8 as transport medium of the media stream or not. In this case, in order to maintain the QoS for the user, a switching to another communication connection candidate 6 or 7 will be effected which provides a better QoS for the user; in this case, the communication connection candidate 7 having been found to provide "excellent" quality will be selected to be switched to for improving the QoS to the user. This flow may be repeated periodically in order to check if new nominated or newly selected candidate 7 is still the one with the best quality. The procedure for switching nominated communication connection candidates is already defined in ICE documentation and thus can be used for switching to the candidate having the better transmission quality.

It is noted that the procedure of nominating the selected connection is always performed by the peer defined as having the "CONTROLLING" role, as defined in the ICE documentation, which in the following is referred to as the ICE-controlling peer, and which in the examples shown is the local peer 1. The other peer, namely, the remote peer 2 will be the ICE-controlled peer. According to the procedure of testing and verifying the quality for each communication connection candidate 6, 7, 8, in the following briefly referred to as "candidate", both peers, the local or ICE-controlling peer 1 and the remote or ICE-controlled peer 2, have to be informed that the test procedure will take place. For this, the creation of a new attribute over the STUN specification is required. In the embodiment, it will be called QUALITY- PROC (quality procedure) attribute with a value that may be defined during implementation or could even be registered in the STUN recommendation according STUN rules for adding new attributes.

Figure 3:
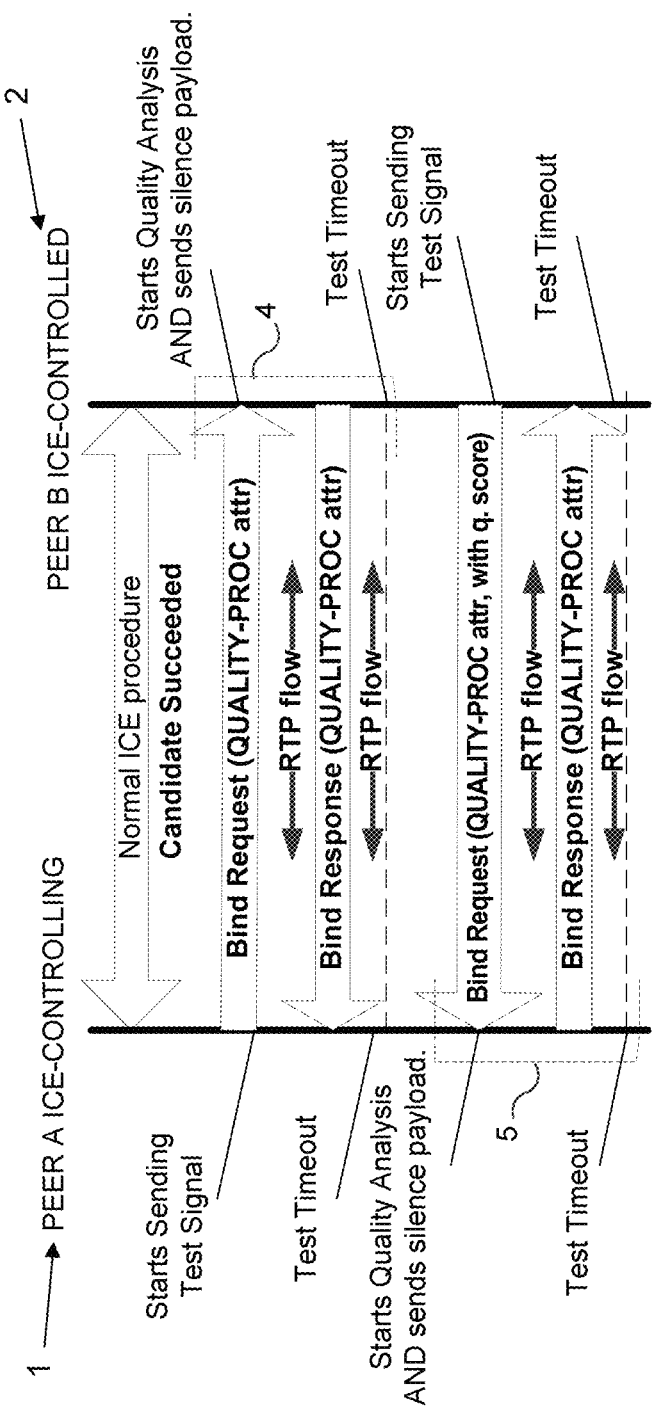
FIG. 3 shows a testing procedure for a communication connection candidate according to an embodiment of the invention.

After the candidates are set to a "succeeded" state, the ICE-controlling peer, here, the local peer 1, will start another procedure in order to verify the score quality of each succeeded candidate, as will be further described in connection with FIG. 3. FIG. 3 shows a testing procedure for a communication connection candidate 6 according to an embodiment of the invention. The peer responsible for starting the quality test is the one with the ICE-Controlling role, here, the local peer 1, which will start the quality verification for one direction of the call, here, the first communication direction, indicated by reference numeral 4 at the tip of the arrow pointing in that direction. Then, just after this test, the ICE-controlled peer 1 will start its direction verification. The peer starting the procedure, here, local peer 1, must select a candidate to test and, via this connection, send a STUNBindRequest message or command with a QUALITY-PROC attribute to the other peer, here, the remote peer 2, and as soon as the ICE-controlling peer 1 has started the procedure, it must start sending the audio test signal also.

The peer that received the STUNBindRequest message with the QUALITY-PROC attribute, here, the remote peer 2 or ICE-controlled peer, then starts its audio detection procedure for subsequent quality analysis and sends the STUN-Bind Response message with the QUALITY-PROC attribute so as to inform to the originator, ICE-controlling peer 1, that the procedure has been started successfully. In order to assure the same network usage as with respect to a normal call, this peer must also start sending payload with silence. If the ICE-controlling peer 1 does not receive the STUN-BindResponse message with the QUALITY-PROC attribute after some pre-defined timeout, it will abort the operation and consider that the remote peer 2 is not able to perform quality verification over this communication connection candidate.

It is noted that the QUALITY-PROC attribute has to comprise one parameter when added to a STUNBindRequest message. This parameter may be a quality score value or a test duration value, depending on the originator agent role. If the STUNBindRequest message is generated by an ICE-Controlling agent, the QUALITY-PROC parameter may represent a timeout in milliseconds; otherwise, if it was generated by an ICE-controlled agent, it may represent a quality score value that was calculated for the candidate. In case the QUALITY-PROC attribute is inside a STUNBindResponse message, it does not require additional parameters.

The test duration parameter will be sent in the STUN-BindRequest message when it is generated by an ICE-Controlling agent, as the local agent 1 in this embodiment, in order to provide information on the duration of the test signal being generated for performing the test, and it will indicate the remote peer 2 the time at which the quality detector (not shown) should be turned on. The ICE-Controlling agent or peer, here the local peer 1, is the one responsible for switching the nominated candidate in case of any quality issues. Also, the ICE-controlling peer has to know the quality value calculated at the remote peer 2. Considering this, the quality score parameter value will be added to the QUALITY-PROC attribute of the STUNBindRequest message by the ICE-controlled agent or peer, here, the remote peer 2, in order to inform the ICE-Controlling agent about the quality score that was calculated when receiving audio test signals. However, the ICE-Controlling agent, in turn, does not need to add any quality score data to this QUALITY-PROC attribute value.

When the ICE-Controlling agent receives a STUNBindRequest message with the QUALITY-PROC parameter, it will not receive a duration time for the test, but instead, the quality score that was calculated by the ICE-Controlled agent. Accordingly, the ICE-controlling peer or agent should use the same duration time that was sent previously in its STUNBindRequest message. The ICE-Controlled agent knows this, since the duration time has been received in the previous STUNBindRequest message.

Figure 4:
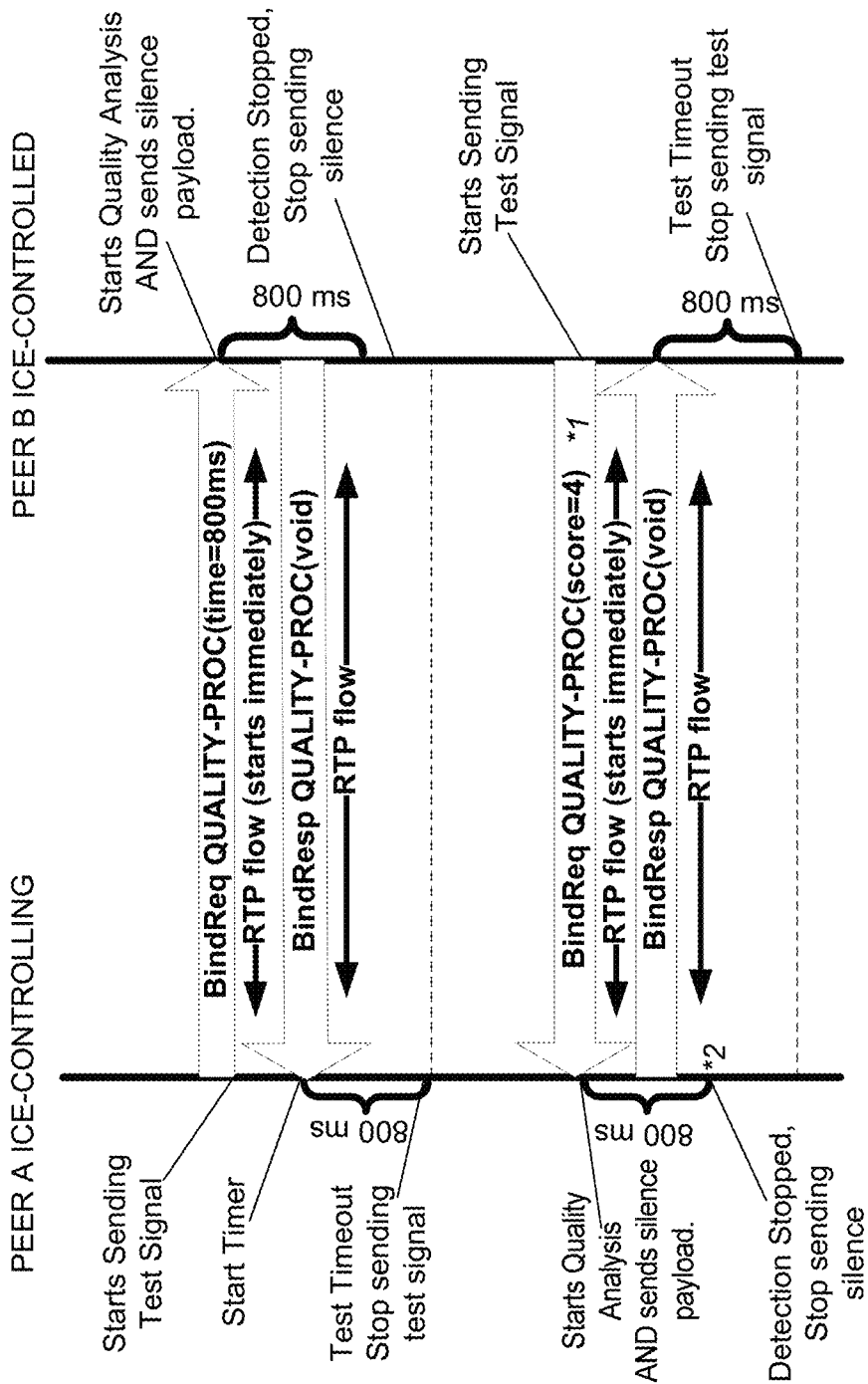
FIG. 4 shows a flow diagram illustrating the use of parameters specified in an ICE protocol comprising an extension according to an embodiment of the invention.

FIG. 4 shows a flow diagram illustrating the use of parameters specified in an ICE protocol comprising an extension according to an embodiment of the invention. Here, in order to assure that the quality detector at the remote peer 2 has completed the detection of the test signal prior to the test signal generation being stripped, a timeout has to be triggered to stop the signal generation. It should be started just after the STUNBindResponse message has arrived, and it should have a value (maximum timeout time) that equals the time duration value that was defined in the STUNBindRequest message. If the next STUNBindRequest message with the QUALITY-PROC parameter transmitted from the ICE-controlling and local peer 1 arrives before this timeout, this means that the test has already been terminated; in this case, it may disable the timer, stop sending the test signal, and start the detection procedure.

When the entire procedure is completed, the ICE-Controlling peer (local peer 1) is in hold of the information on the quality of the communication connection in both directions, the first communication direction 4 and the second communication direction 5, and the procedure may be repeated for all communication connection candidates. After all quality scores have been calculated, the system will be able to switch the nominated candidate (for example, nominated candidate 8 in FIG. 2) according to the quality of each communication connection candidate (for example, to candidate 7 in FIG. 2).

In the following, the quality score generation is described. The procedure for score generation is basically a procedure according to which the sender sends a known periodical test signal to the receiver side. And then, the receiver side performs the separation of the audio stream in pieces called windows. For each window, the receiver side computes the frequency domain representation of them using FFT algorithm. Each window in frequency domain may be compared with a reference that was previously computed considering that the receiver side already knows the signal that is being transmitted by the sender side. The score metric may follow the definitions of ITU-T P.800.2 MOS, which, in short, is a subjective recommendation for scoring audio/video quality according the table 1.

TABLE 1

| Recommendation for scoring audio/video quality | |
|---|---|
| Excellent | 5 |
| Good | 4 |
| Fair | 3 |
| Poor | 2 |
| Bad | 1 |

In the following, a testing procedure for a nominated or selected communication connection candidate (as candidate 8 in FIG. 2) will be described. This candidate was nominated or selected as a channel for transmitting or transporting the media stream from a local peer 1 to a remote peer 2 by the normal ICE procedure. Here, there is user's audio being transferred from one peer to another, and then, it will not be possible to replace the signal sent by the sender side since it is already transmitting the user's audio and it could affect the user's experience. Then, instead of just sending the known periodical test signal in the sender side to the receiver side, it must mix the user's audio input with the known periodical test signal. Further, the receiver side must be able to separate the signals again, sending the separated periodical test signal to be processed by the quality score generation procedures and the separated real user's audio, without the mixed signal, to the headset.

Alternatively, a more reliable solution may be to change the nominated candidate (as candidate 8 in FIG. 2) to another one (as candidate 6 or 7 in FIG. 2), only for the time of performing the quality verification on this channel. In this case, it is preferable to carry out the quality verification of the nominated candidate as the last one in the sequence of testing.

With respect to the testing time, it is noted that the latter depends on how much time each test takes as well as the number of candidates that are ready to be tested. If there is a large number of candidates to be tested, the time duration of the testing may be rather long. However, considering that the problems may occur stochastically (i.e., for example, that they occur only after some time has elapsed due to problems in the past), the duration for testing each candidate should not be that relevant, since calls, for example, with a short duration do not need constant quality verification.

As an example, it is referred to FIG. 2 again, in which figure a test with three candidates 6, 7, and 8 is illustrated. Considering 0.6 seconds test duration in each direction, the entire testing flow would take 3.6 seconds, this time period not being long enough for a call, during which the user may encounter quality issues. However, considering a longer call, a good indication can be provided on the connection candidate providing the best or at least a better signal quality.

With respect to bandwidth considerations, the following is still noted. Some ICE implementations are very exhaustive when probing candidates, and if a large number of candidates is to be tested, or an excessive number of ICE verifications is carried out on each candidate, this could lead to an excessive usage of bandwidth possibly causing problems with respect to the call. In order to avoid the concurrence between ICE probing and the audio quality checks, the audio quality checks may start just after one candidate is already nominated, thereby reducing the periodicity of ICE probing. It is also preferable that just one quality check is carried out at a time in order to avoid excessive CPU usage due to processing audio signals, and to avoid excessive network bandwidth usage.

In order to assure that the nominated candidate is not by the quality checks, the periodicity of audio quality checks may be defined dynamically and dependent on the device environment. However, it is preferable that one quality check of one second takes place every two seconds.

In order to avoid performing audio quality check on too many candidates, for example, in case the number of candidates to be checked exceeds a predetermined threshold, for example, more than four candidates, according to an embodiment, a candidate that has the worst quality result may be discarded. Another possibility is to reduce the periodicity of quality checks for this candidate. For example, referring again to FIG. 2, at "Time 4", the last candidate 8 has been found to provide bad quality; in this case, the quality check on this candidate may be avoided, or the checking periodicity may be reduced for this candidate.

It should be appreciated that different changes can be made to embodiments of the method, communication apparatus, and system to meet different sets of design criteria. For instance, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a system, a communication apparatus, and methods of making and using the same have been shown and described above, it is to be distinctly understood that the invention is not limited thereto but may be otherwise variously embodied and practiced within the scope of the following claims.

What is claimed is:

1. A method for selecting a communication connection candidate for transmission of a media stream via a media connection over a communications network, the method comprising the steps of:
   using Interactive Connectivity Establishment (ICE) protocol for selecting, based on a connectivity check, from a predetermined number of communication connection candidates, a transmission communication connection candidate for transmitting the media stream from a local peer to a remote peer;
   during transmission of the media stream from the local peer to the remote peer via the selected transmission communication connection candidate, testing the communication connection candidates with respect to Quality of Service (QoS), in both communication directions, the local peer or the remote peer initiating the testing during the transmission of the media stream from the local peer to the remote peer via the selected transmission communication connection candidate;
   the local peer or the remote peer that initiated the testing comparing the QoS of at least one tested communication connection candidate to the QoS of the selected communication connection candidate transmitting the media stream, and
   upon a determination that the comparing results in the at least one tested communication connection candidate providing a better QoS than the QoS of the selected communication connection candidate transmitting the media stream, the local peer or the remote peer that initiated the testing also initiating switching of the transmission of the media stream to the tested communication connection candidate providing the better QoS.

2. The method of claim 1, wherein the step of testing the QoS is carried out using the ICE protocol.

3. The method of claim 2, wherein the testing of the QoS is carried out periodically during the transmission of the media stream.

4. The method of claim 3, wherein the step of testing the communication connection candidates is carried out sequentially, one by one.

5. The method of claim 4, wherein for switching the transmission of the media stream to the at least one tested communication connection candidate providing the better QoS, a procedure defined in the ICE protocol is used.

6. The method of claim 5, comprising:
   informing the local peer or the remote peer about the testing procedure.

7. The method of claim 6, wherein the testing procedure is initiated by the peer defined in the ICE protocol as the ICE-controlling peer to start the testing, wherein the ICE-controlling peer will start the testing procedure for a first communication direction from the ICE-controlling peer to an ICE-controlled peer.

8. The method of claim 7, the testing comprises:
adding a new attribute QUALITY-PROC into at least one of a STUNBindRequest message of the ICE protocol and a STUNBindResponse message of the ICE protocol.

9. The method of claim 8, wherein, the new attribute QUALITY-PROC is added to the STUNBindRequest message and the new attribute QUALITY-PROC comprises a parameter specifying a test duration value when being sent from the ICE-controlling peer, and a quality score value when being sent from the ICE-controlled peer.

10. The method of claim 9, wherein the ICE-controlling peer selects, from the communication connection candidates, a first communication connection candidate to be tested, wherein the ICE-controlling peer sends the STUNBindRequest message comprising the new attribute QUALITY-PROC to the ICE-controlled peer for starting the testing.

11. The method of claim 10, wherein subsequent to the step of sending the STUNBindRequest message comprising the new attribute QUALITY-PROC, the ICE-controlling peer starts sending an audio test signal to the ICE-controlled peer via the first communication connection candidate to be tested.

12. The method of claim 11, comprising:
the ICE-controlled peer starting an audio detection procedure in response to receiving the STUNBindRequest message comprising the new attribute QUALITY-PROC.

13. The method of claim 12, comprising:
the ICE-controlled peer sending a STUNBindResponse message with the new QUALITY-PROC attribute for informing the ICE-controlling peer that the ICE-controlled peer has started the testing procedure about a successful start after starting the audio detection procedure.

14. The method of claim 11, wherein the step of switching the transmission of the media stream to the communication connection candidate providing the better QoS is carried out by the ICE-controlling peer.

15. A system for selecting a communication connection candidate for transmission of a media stream via a media connection over a communications network, the system comprising:
a plurality of peer-to-peer communication connection candidates, each of the peer-to-peer communication connection candidates configured to connect a local peer to a remote peer via a communication network;
at least one of the local peer and the remote peer configured to use Interactive Connectivity Establishment (ICE) protocol for selecting, based on a connectivity check of the communication connection candidates, a first peer-to-peer communication connection candidate of the communication candidates for transmitting a media stream from the local peer to the remote peer;
at least one of the local peer and the remote peer configured so that, during transmission of the media stream from the local peer to the remote peer via the selected first communication connection candidate, the other peer-to-peer communication connection candidates are tested with respect to Quality of Service (QoS), in both communication directions so that the QoS of the tested communication connection candidates is comparable to the QoS of the selected first communication connection candidate transmitting the media stream, and upon a determination that one of the tested communication connection candidates provide a better QoS than the QoS of the selected first communication connection candidate transmitting the media stream, the local peer or the remote peer that initiated testing of the other peer-to-peer communication connection candidates initiating switching of the transmission of the media stream to the tested communication connection candidate providing the better QoS.

16. A communication apparatus comprising:
a local peer that is communicatively connectable to a plurality of peer-to-peer communication connection candidates, each of the peer-to-peer communication connection candidates configured to connect the local peer to a remote peer via a communication network;
the local peer being configured to use Interactive Connectivity Establishment (ICE) protocol for selecting, based on a connectivity check of the communication connection candidates, a first peer-to-peer communication connection candidate of the communication candidates for transmitting a media stream from the local peer to the remote peer;
the local peer configured so that, during transmission of the media stream from the local peer to the remote peer via the selected first communication connection candidate, the other peer-to-peer communication connection candidates are tested with respect to Quality of Service (QoS), in both communication directions so that the QoS of the tested communication connection candidates is comparable to the QoS of the selected first communication connection candidate transmitting the media stream, the local peer configured to initiate testing of the QoS of the other peer-to-peer communication connection candidates, and upon a determination that one of the tested communication connection candidates provide a better QoS than the QoS of the selected first communication connection candidate transmitting the media stream, the local peer initiating switching of the transmission of the media stream to the tested communication connection candidate providing the better QoS.

17. The communication apparatus of claim 16, wherein each of the of peer-to-peer communication connection candidates provide a connection to a different communication network.

18. The communication apparatus of claim 17, comprising:
the remote peer and the peer-to-peer communication connection candidates, wherein the local peer is a computer device comprising a processor connected to a non-transitory computer readable medium and the remote peer is a computer device comprising a processor connected to a non-transitory computer readable medium.

19. The communication apparatus of claim 17, wherein the local peer is an ICE-controlling peer in accordance with ICE protocol and, to start the testing, the local peer initiates testing by sending a STUNBindRequest message having a parameter specifying a test duration value to the remote peer and subsequently sends an audio test signal to the remote peer via a second communication connection candidate so that the remote peer initiates an audio detection procedure in response to receiving the STUNBindRequest message for detection of the audio test signal sent via the second communication connection candidate for testing of the QoS of the second communication connection candidate.

\* \* \* \* \*